July 28, 1942.   L. J. REYSA ET AL   2,291,562
ILLUMINATED FLUID TESTING MEANS
Filed May 22, 1940
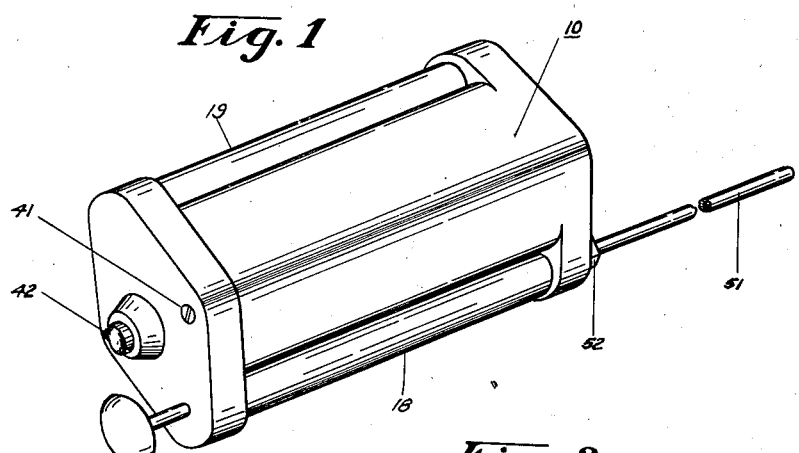
Fig. 1
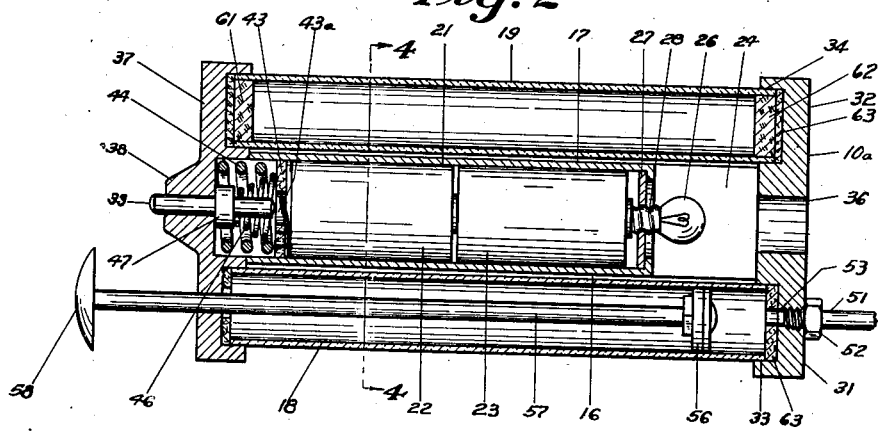
Fig. 2
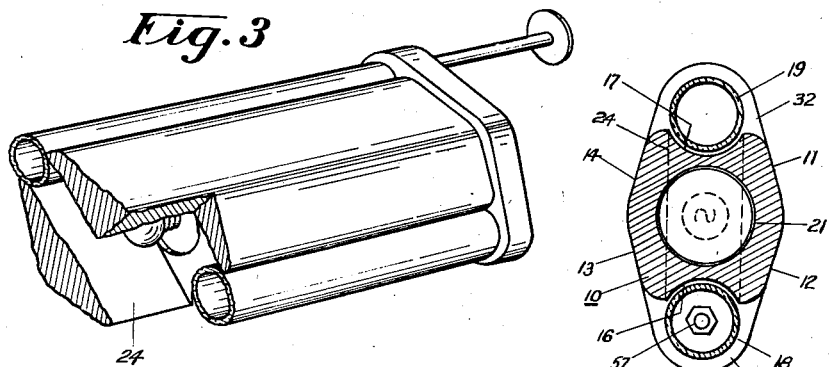
Fig. 3
Fig. 4
INVENTORS.
LESTER J. REYSA
FLOURNOY COREY
ROBERT DONALD PITTS
BY: *Flournoy Corey*
ATTORNEY.

Patented July 28, 1942

2,291,562

UNITED STATES PATENT OFFICE 2,291,562

ILLUMINATED FLUID TESTING MEANS

Lester J. Reysa, Flournoy Corey, and Robert Donald Pitts, Cedar Rapids, Iowa, assignors to Robert S. Milner, Cedar Rapids, Iowa Application May 22, 1940, Serial No. 336,680

4 Claims. (Cl. 88—14)

This invention relates to means for testing or comparing fluids such as oil and the like, and relates particularly to an illuminated fluid testing means for visually inspecting oil and like fluids, for viscosity, fluidity, and pollution.

In the operation of internal combustion engines and general lubrication of machinery the purity and color, fluidity, and viscosity of the oil, particularly after use for a time and while it is still in the motor or the machine, are of importance.

This invention has for one of its objects the provision of means for withdrawing oil from the crank case of a motor vehicle or the like and placing it in a glass tube for comparison with a standard sample of clean, new oil.

Another object of the invention is to provide a suction pump and pump casing suitable for comparing the test sample of oil with a standard sample.

Still another important object of our invention is to provide means integral with the pump structure for illuminating the test sample and the standard sample.

Other and further features and objects of the invention will be more apparent to those skilled in the art upon a consideration of the accompanying drawing and following specification, wherein is disclosed a single exemplary embodiment of the invention, with the understanding, however, that such changes may be made therein as fall within the scope of the appended claims, without departing from the spirit of the invention.

In said drawing:

Figure 1 is a view in perspective of a device constructed according to one embodiment of our invention.

Figure 2 is a view, partly in section and partly in elevation, of the device shown in Figure 1.

Figure 3 is a view in perspective of the device shown in Figures 1 and 2 but with portions of the structure broken away to show the illuminating means, and Figure 4 is a view in section taken along the line 4—4 of Figure 2.

Referring now to the drawing:

The main body of the device, illustrated at 10, is in the form of an approximately six-sided figure, as shown more particularly in Figure 4, having the exposed faces 11 and 12 parallel to the faces 13 and 14 respectively and having approximately semi-cylindrical recesses 16 and 17 for the reception of glass tubes 18 and 19. The interior of the body 10 is hollow, as indicated at 21, to receive the flash light batteries 22 and 23.

The body 10 is also provided with a slot 24 extending transversely through one end thereof to permit light from the light bulb 26 to illuminate the lower ends of tubes 18 and 19.

The light bulb 26 is supported in operative position by a washer-like receptacle 27 having an opening through the center thereof which is threaded to receive the base 28 of the bulb. One end of the body member 10 is shaped, as at 10a, to provide bosses 31 and 32 for receiving one end of each of the tubes 18 and 19, the bosses 31 and 32 being cored out or drilled to receive the ends of the tubes as indicated at 33 and 34. A circular opening 36 may be provided in the end member 10a communicating with the slot 24 so that light from the bulb 26 will shine down onto the engine to assist in locating the oil stick opening through which the oil sample may be drawn.

A top or cap member 37 is of substantially the same shape as the portion 10a of the body member 10 except that the boss 38 is provided to act as a guide for a metal plunger 39, or push rod, for making contact with the outer shell of the cell 22 to complete the circuit through the cap, the main body portion, the receptacle 27, and the lamp 26.

In this embodiment of the invention the cap 37 is secured to the body member 10 by means of screws 41 and 42 which are threaded into the body. An insulating washer 43 is provided at the base of cell 22 and is biased inwardly against the cell by means of the spring 44 to cause and maintain a good contact through the batteries and bulb. A second spring 46 bears against the washer 43 and against the collar 47 on plunger 39 to hold the plunger normally out of contact with the base of the cell 22. Pressure of the thumb on the plunger 39 causes its inner end to pass through an opening 43a in the insulating washer and make contact with the case of cell 22.

Resilient sealing gaskets 63 of some oil resistant material such as treated rubber, Neophrene or the like are used within each of the tube receptacles 33 and 34 and the similar openings in the cap member. The tubes are drawn down tightly upon these gaskets so as to seal them against leakage.

In order to draw a sample of oil from the crank case of a motor, we preferably utilize a small tube, such as the copper pipe or tube indicated at 51. This tube is provided with a fitting 52 which is threaded into a suitable opening 53 in the member 10a and which is in communication with the interior of the tube 18. A piston 56 is provided within the tube 18 and may be moved within the tube by means of the piston rod 57 and the handle 58.

In use the tube 51 is inserted down the filler tube or oil stick opening with the end in the oil sump of the crankcase of the engine. The pump rod 57 is drawn outwardly to draw oil from the crankcase into the tube 18. The tube 19 is preferably filled with a specimen of clean new oil which is sealed in by means of the plugs 61 and 62. The test specimen may be compared with the clear sample for viscosity, clarity, pollution, color, and the like.

At night in using the device the plunger 39 may be depressed to energize the lamp 26 so that the light from the lamp illuminates the engine to help in locating the filler tube or oil stick opening, and also to illuminate the tubes for better comparison of the test specimen with the sample.

Although we have described a specific embodiment of our invention, it is apparent that modifications thereof may be made by those skilled in the art. Such modifications may be made without departing from the spirit and scope of our invention as set forth in the appended claims.

We claim as our invention:

1. In a fluid comparison means, a T-shaped body having an opening through the central leg thereof for receiving dry cells and a bulb, openings in the walls of the body opposite the bulb, transparent display and sample tubes extending along the sides of the body and opposite the openings to permit the bulb to illuminate parts of the tubes, a sampler pipe connected to one of the tubes, a means comprising a piston and rod for drawing a sample of fluid into that tube through the pipe, the cross leg of the T-shaped body having recesses for receiving the tubes, a cap member also having recesses for the tubes, screw means for attaching the cap to the body and for clamping the tubes in position in the recesses, and a switch in the cap for energizing the bulb.

2. In a fluid comparison device, a pair of transparent tubes spaced apart and in substantially parallel relation, a main body portion disposed substantially between the tubes and parallel thereto, the said body portion having a battery recess extending longitudinally thereof for receiving batteries and a bulb and having a slot extending transversely thereof for directly light from the bulb against the tubes, projections extending laterally from the body portion at one end thereof, said projections having recesses for receiving one end of each tube, a piston within one of the tubes, a plunger connected therewith, and a cap engageable with the body portion at the end thereof opposite the projections for securing batteries in the battery recess, the said cap having recesses for receiving the adjacent ends of the tubes and an opening for receiving and guiding the plunger.

3. In a fluid comparison device, a pair of transparent tubes, a battery casing disposed in spaced relation parallel thereto, means comprising projections extending from one end of the casing for securing the adjacent ends of the tubes, a cap receivable on the other end of the casing for securing the ends of the tubes adjacent thereto and for securing batteries within the battery casing, the said casing having a transversely extending opening to permit a lighted bulb in the battery casing to illuminate at least a part of both tubes, and means including a piston and a plunger for drawing a sample of a fluid into one tube.

4. In a fluid comparison device, a pair of transparent tubes, a main body portion having a battery compartment disposed longitudinally therein, legs extending transversely from the body portion at one end thereof, a cap at the opposite end of the body portion for closing the battery compartment, the said cap having portions thereof disposed opposite to the legs first mentioned, the longitudinal edges of the main body being recessed to provide grooves for partially receiving the tubes, the transverse legs and the cap having cylindrical recesses for receiving and securing the ends of the tubes in position, the said body having a transverse opening extending therethrough adjacent one end thereof, means for mounting a bulb within the transverse opening for contact with one end of a battery disposed within the battery compartment, and means including a push button in the cap for completing a circuit through the cap, the body portion, the bulb and a battery in the battery compartment.

LESTER J. REYSA.
FLOURNOY COREY.
ROBERT DONALD PITTS.